(No Model.)
W. M. CLOW.
WIRE FENCE COUPLER.
No. 354,096. Patented Dec. 14, 1886.
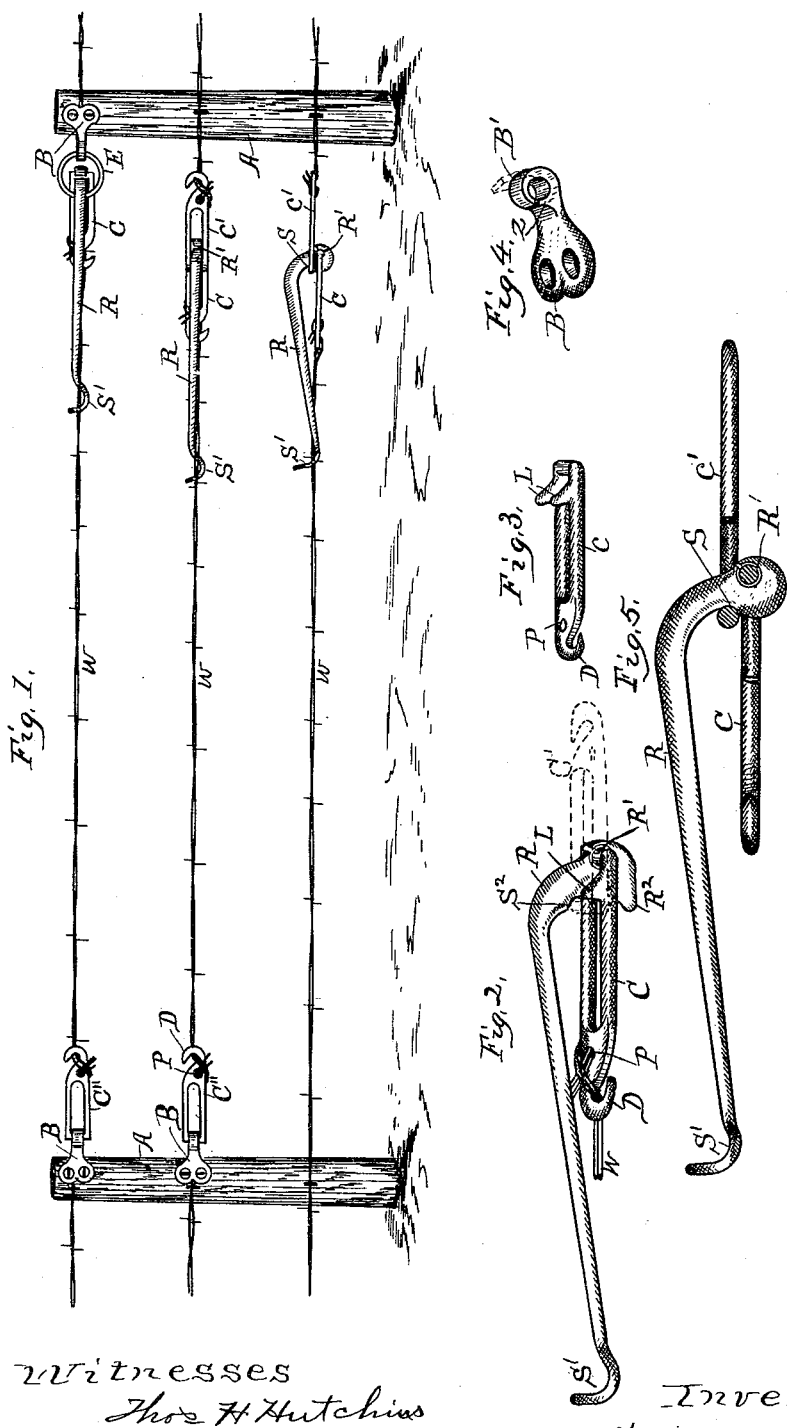
Witnesses
Thos. H. Hutchins
Wm. J. Hutchins
Inventor,
William M. Clow.

UNITED STATES PATENT OFFICE.

WILLIAM M. CLOW, OF WHEATLAND, ILLINOIS.

WIRE-FENCE COUPLER.

SPECIFICATION forming part of Letters Patent No. 354,096, dated December 14, 1886.

Application filed August 25, 1886. Serial No. 211,796. (No model.)

*To all whom it may concern:*

Be it known that I, WILLIAM M. CLOW, a citizen of the United States of America, residing at Wheatland, in the county of Will and State of Illinois, have invented certain new and useful Improvements in Wire-Fence Couplers, of which the following is a specification, reference being had therein to the accompanying drawings.

This invention relates to certain improvements in wire-fence couplers for detachably connecting the wires of a fence-panel in such manner that the panel-wires may be uncoupled and swung back to form passage-ways through the fence, and is designed as an improvement on my Letters Patent of the United States for coupling for wire fences, granted May 20, 1884, No. 298,827.

The construction and operation of this invention is fully set forth and explained in the following specification and claims, reference being had to the accompanying drawings, and the letters and figures thereon, which form a part of this specification, in which—

Figure 1 is a perspective view of a panel of fence, showing the coupler applied to its strand-wires as it would appear in actual use. Fig. 2 is a perspective view of the lever of the coupler, showing it attached to one of the coupler-links, and a second or fulcrum link, shown in dotted lines and represented as hooked over lugs on its fellow link, to relieve the lever from the strain of the fence-wires, and showing the lever provided with a lug for detaching said fulcrum-link from the lugs of its fellow link. Fig. 3 is a perspective view of one of the coupler-links, having lugs at one end over which to hook its fellow link, and an aperture and hook at its opposite end for adjustably attaching it to the fence-wires. Fig. 4 is a perspective view of a hooked plate for connecting the fence-wires to the posts; and Fig. 5 is a side view of the lever of the coupler, showing it in position between the coupler-links, a portion of the links being broken away to show the manner of their attachment to the said lever.

A represents the posts of a wire fence, and W are the fence-wires.

R represents the lever of the coupler, having an inclosing hook or eye, R', and terminating at its opposite end in the hook S'.

C represents a link having a hook, D, and an aperture, P, and hinged with lever R by hook or eye R', and C' represents a similar link arranged over lever R and journaled in the bearing S, and forming the fulcrum for lever R.

B represents a plate, which has screw or nail holes through its body for securing it to the post, and also has an inclosing hook or eye, B', formed on its extending end.

C" represents a link similar to links C and C', hinged to plate B in its hook or eye B'. The hooks D and apertures P of the said links are for the purpose of securing the fence-wires W to them, which is done in the following manner: The end of the wire is first passed through aperture P the desired distance. It is then brought around the side of the link across the projecting end, and thence under hook D, as shown in Figs. 1 and 2, thus providing a means of readily taking up or letting out wire at the links by releasing the wire from the hook D and passing it either way desired through aperture P.

In attaching the couplers to a fence the panel-wires are cut near one post, and the cut ends are secured to links C and C', as described. The lever R is then placed in a perpendicular position and passed through link C', resting said link in its curve near its hinged connection with link C. When in such position, the links will not meet, and the wires W will be slack, and to tighten them lever R is operated to draw links C and C' to overlap each other, and its hooked end S' is then placed under the panel-wire W, which locks the coupler closed, as shown in Fig. 1.

When it is desired to form passage-ways through fences for occasional use, a coupler is attached to each wire of a fence-panel, as described, and when it is desired to open said panel the hooked ends S' of the levers are released and the levers removed from links C' and the wires swung to one side. To prevent the wires W from being broken by bending, the plates B and hinged links C" are used, as shown in Fig. 1, for securing said panel-wires to the hinge-post.

A plate, B, with a ring, E, (shown in Fig. 1,) may be secured to the post A next to the coupler and be a substitute for link C' by passing lever R through said ring, as shown in said figure.

Lever R is provided in the lower part of its curved end with a shoulder, S, upon which link C' is seated when in service, as shown in Fig. 5. This is for the purpose of properly supporting said link while the lever R is being operated.

When it is desired that the links C and C' shall be united when the coupler is locked closed, link C is provided with side lugs, L, arranged at the side of lever R, as shown in Figs. 2 and 3, and when link C' is brought to overlap link C shoulder $S^2$ of lever R will force it over said lugs L, and thus unite the links and relieve the lever from strain. When the coupler is opened, the lug $R^2$ of its lever will engage and lift link C' (see dotted lines in Fig. 2) from said lugs L, and thus disengage said links. The eye or hook B' of plate B is, in the first instance, cast in the form shown by dotted lines in Fig. 4, and when united with link C'' is bent to inclose said link and meet lug Z of said plate, which forms a part of said inclosure.

The lever R shown in Fig. 2 is precisely the same in form as that shown in Fig. 5, except that it has the lug portion $R^2$ for the purpose of raising link C' off the lugs L of link C when said lever is turned backward; also, the hooked bearings R' of said levers are the same in each case, and formed the same as that shown at B' in Fig. 4.

Having thus described my invention, what I claim as new, and desire to secure by Letters Patent, is as follows, to wit:

1. The coupler for wire fences shown and described, consisting of the lever R, of the second kind, having the hook S' and bearings S and R', in combination with the links C and C' and fence-wire W, the said links being provided with the apertures P and hooks D, for the purpose of adjustably attaching said fence-wires thereto, substantially as and for the purpose set forth.

2. The combination, with the fence-wires, of the lever R, having the hook S' and lug $R^2$, link C, having the lugs L, and link C', said links having the apertures P and hooks D, for adjustably attaching the fence-wires thereto, substantially as and for the purpose set forth.

WILLIAM M. CLOW.

Witnesses:
WM. J. HUTCHINS,
THOS. H. HUTCHINS.